Figure 1:
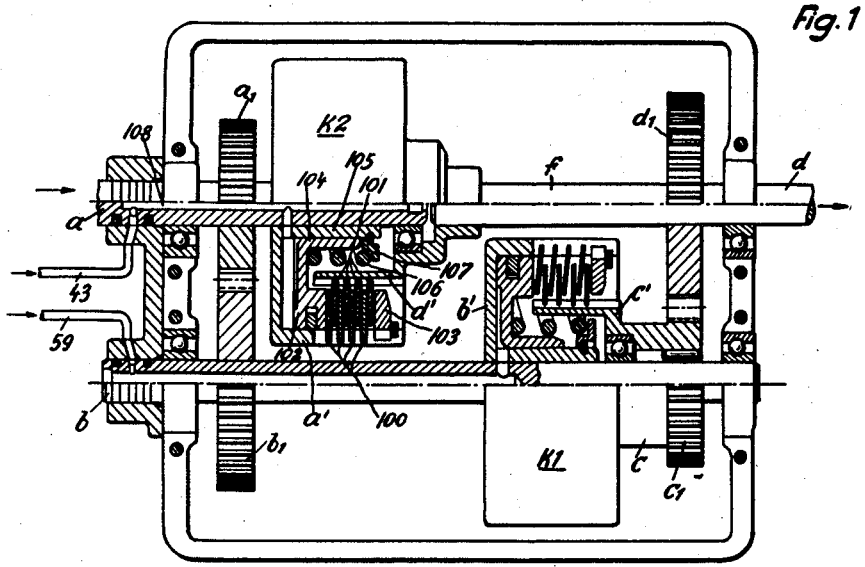

Jan. 12, 1960 HANS-JOACHIM M. FÖRSTER 2,920,496
METHOD OF CONTROLLING AND RATIO CHANGING MECHANISM
FOR A SPEED CHANGE TRANSMISSION
Filed April 18, 1957 6 Sheets-Sheet 1

INVENTOR
HANS-JOACHIM M. FÖRSTER
BY *Dicke a Craig*
ATTORNEYS

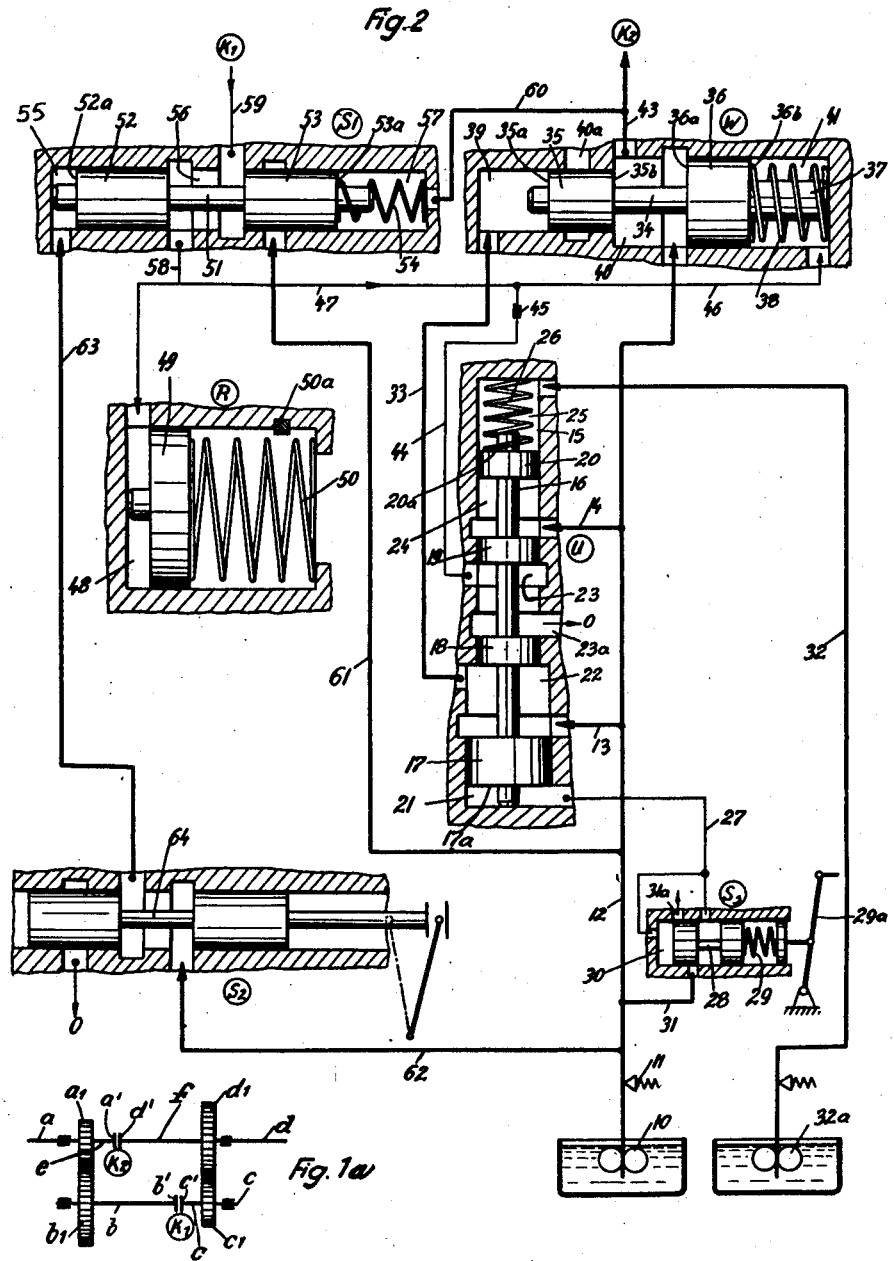

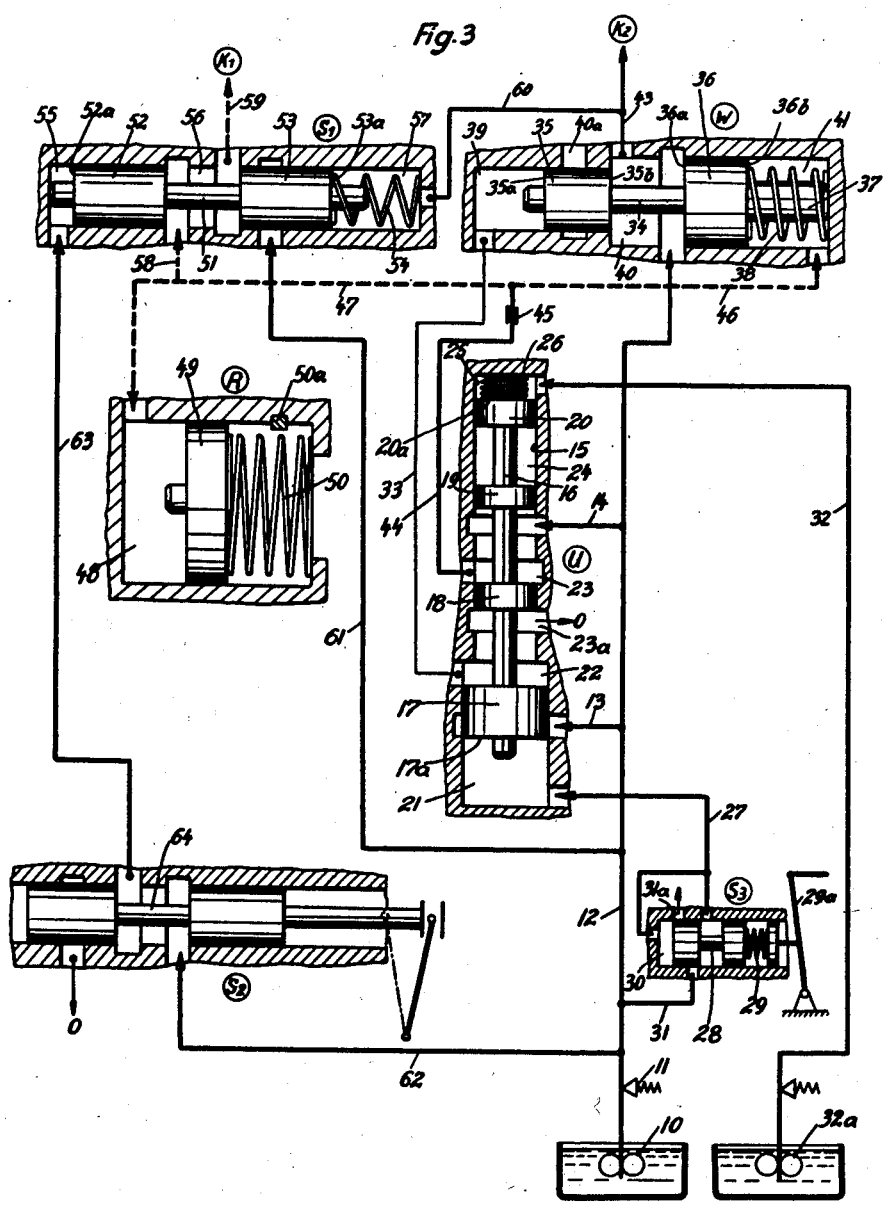

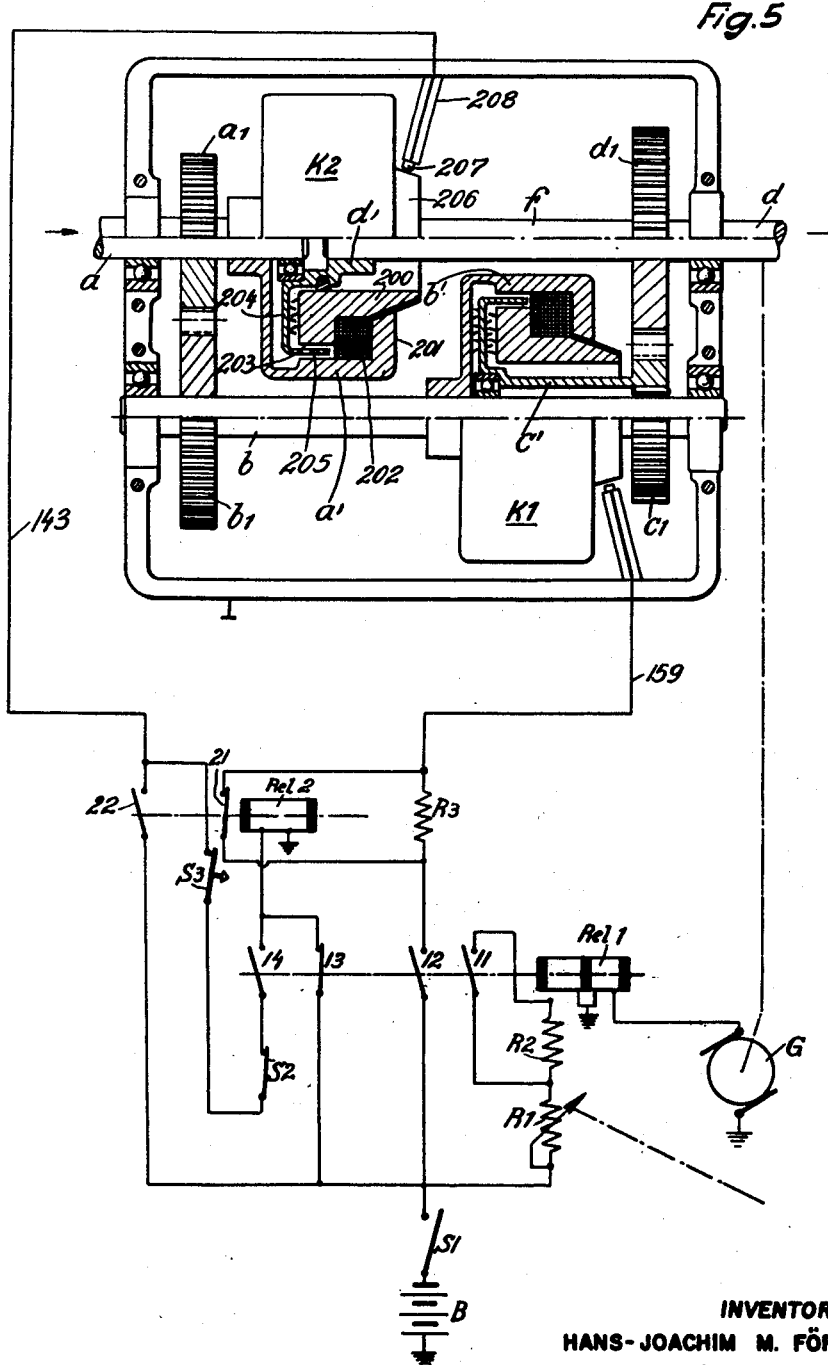

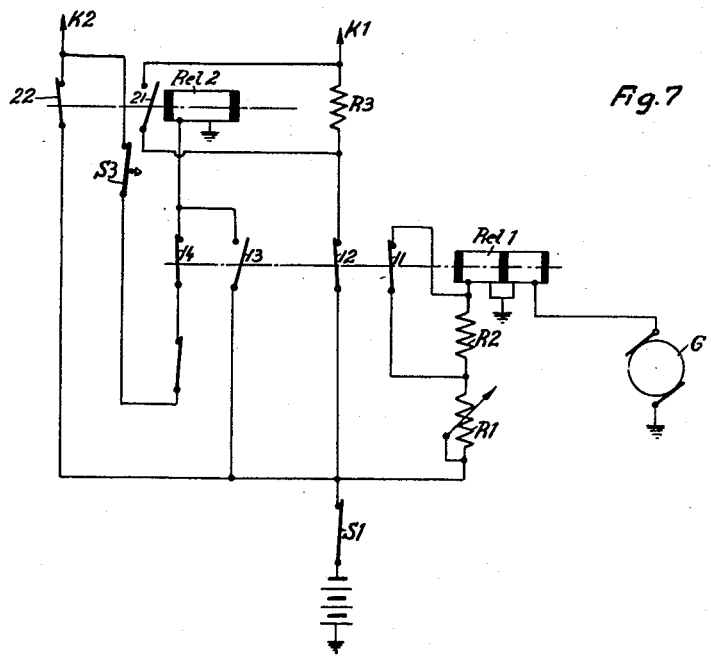
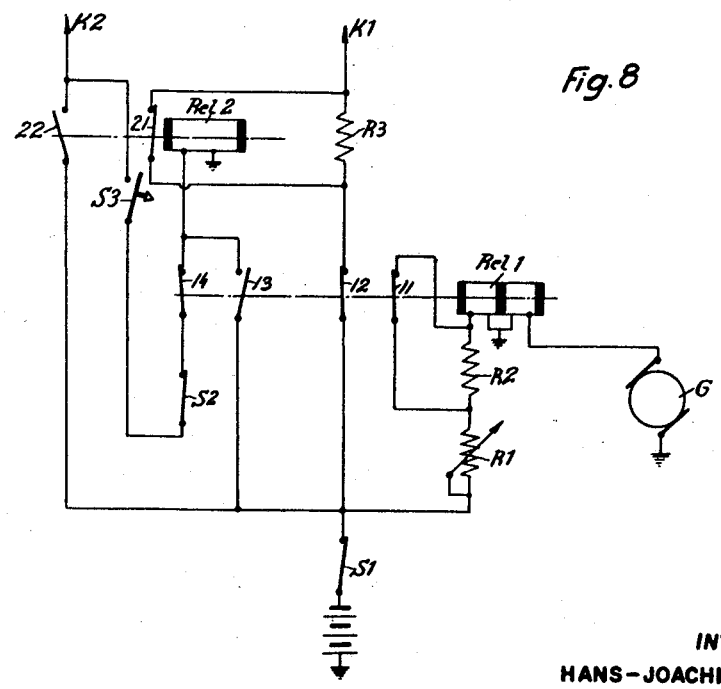

United States Patent Office 2,920,496
Patented Jan. 12, 1960

2,920,496

METHOD OF CONTROLLING AND RATIO CHANGING MECHANISM FOR A SPEED CHANGE TRANSMISSION

Hans-Joachim M. Förster, Stuttgart, Germany, assignor to Daimler-Benz Aktiengesellschaft, Stuttgart, Germany Application April 18, 1957, Serial No. 653,702

7 Claims. (Cl. 74—357)

This is a continuation-in-part of my earlier patent application Ser. No. 555,988, filed on December 28, 1955, relating to "Method of Controlling and Gear Shift Mechanism for a Speed Change Transmission."

My invention relates to a method of controlling and a ratio changing mechanism for a speed change transmission of the type in which the input shaft and the output shaft of the transmission are connected by a plurality of trains of motion-transmitting elements having different ratios of transmission, each train including a friction element, such as a disengageable friction clutch or brake. In transmissions of this type, the ratio-changing operation comprises the disengagement of at least one of such friction clutches and the engagement of another friction clutch. It is the object of my invention to provide an improved method and mechanism for performing such ratio-changing operation without interruption of the transfer of power from the input shaft to the output shaft or vice versa.

In shifting the transmission to a higher speed ratio of the output shaft, certain rules must be complied with which are definite and comparatively simple since in such ratio changing operation the engine must be connected to an element that had been rotating at a lower speed. Therefore, it is necessary only to postpone releasing the friction clutch which had been instrumental in effecting the power transfer prior to the gear shift operation until the frictional engagement of the other clutch to be engaged has increased to a point where such other clutch is capable of transferring the momentaneous driving couple (positive overlapping). A ratio changing operation to a lower speed, however, involves more complicated problems, particularly where the engine throttle is to be kept open. This ratio changing operation requires that the engine be clutched to an element that had been rotating at a higher speed entailing a reduction of the couple transferred to the output shaft because a portion of the engine torque must be consumed in accelerating the engine. Where the speed change transmission under consideration is that of a motor vehicle, the driver in shifting the transmission to a lower speed is often desirous of accelerating the vehicle. Therefore, it would be impracticable to accelerate the engine by transfer of power from the output shaft to the input shaft, i.e. under coasting conditions, as that would have a decelerating or braking effect on the vehicle.

In prior automatic transmissions, a free-wheeling clutch is provided which permits the transmission to be shifted to a lower speed with open throttle or means are provided which simulate the conditions afforded by such a free-wheeling clutch. In these prior transmissions the operation of shifting the transmission to a lower speed may be effected in a minimum of time because the engine is temporarily relieved from load rendering its full power available for acceleration of its speed of rotation. In such prior transmission, however, the ratio changing operation requires an interruption of power transferred from the driving shaft to the driven shaft, whereas it is the object of the invention to provide a method and means for effecting a ratio changing operation to a lower speed without interrupting such transfer of power.

It is a further object of the present invention to provide an improved ratio changing mechanism in which the engagement of clutches is controlled by an auxiliary hydraulic, pneumatic or electrical force.

Figure 6:
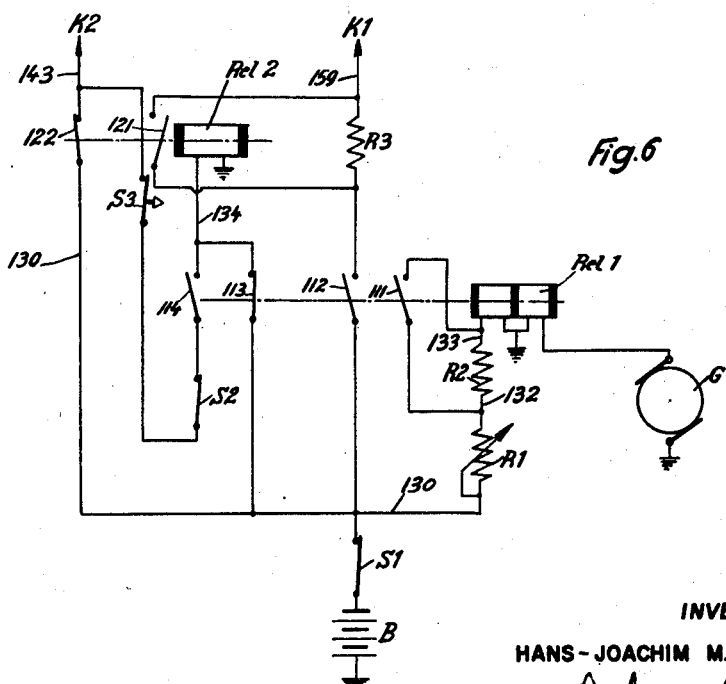
Figure 4:
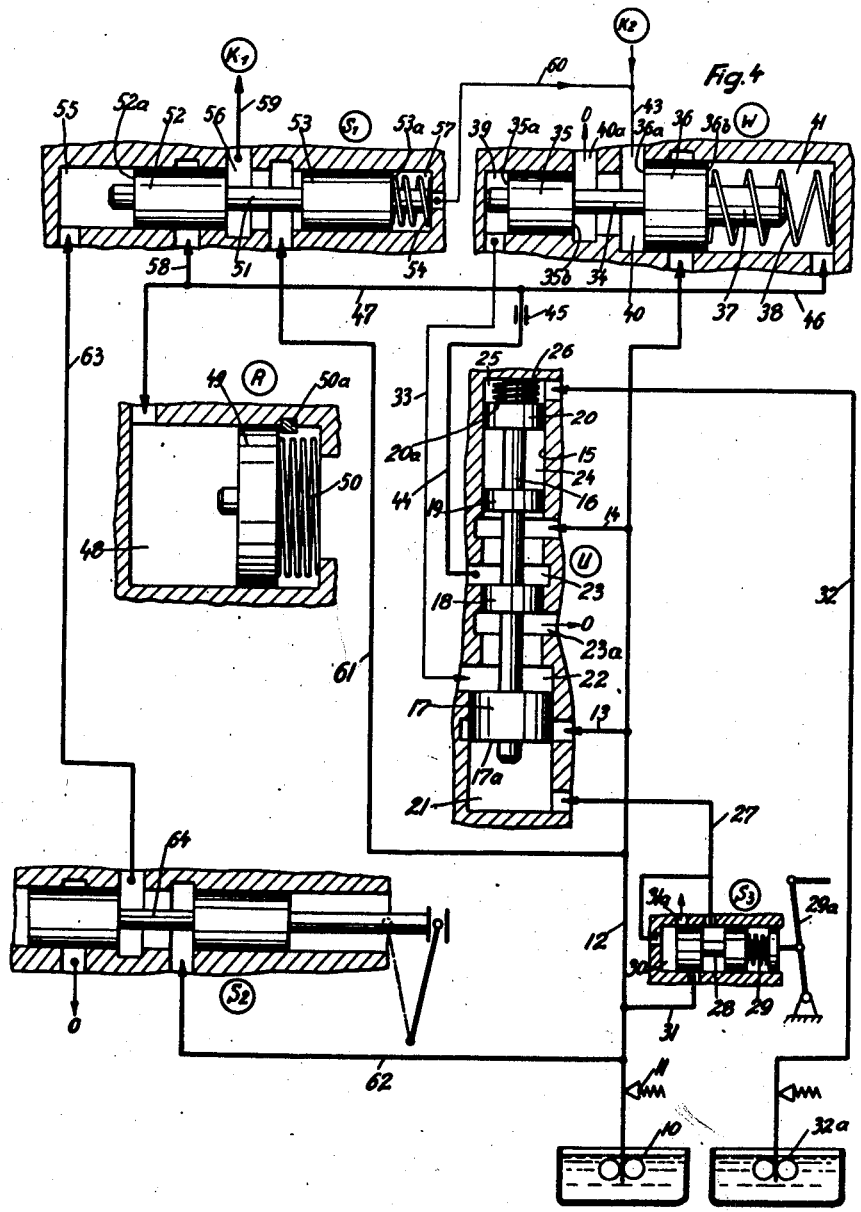

Further objects of the present invention will appear from a detailed description of a preferred embodiment of the invention following hereinafter with reference to the accompanying drawings, it being understood that such drawings serve the purpose of illustrating the invention rather than that of restricting or limiting the same. The features of novelty are set forth in the claims. In the drawings Fig. 1 is an elevation, partially in section, of a speed change transmission of a known two-speed type to which my novel method and my novel ratio changing mechanism are applicable;

Fig. 1a is a schematic diagram of the transmission illustrated in cross section in Figure 1;

Figs. 2, 3 and 4 are diagrammatic representations of a preferred embodiment of the improved ratio changing mechanism including a plurality of slide valves shown in axial section and connecting conduits illustrated by simple lines, heavy lines indicating conduits under pressure and thin lines indicating conduits connected to exhaust, the direction of flow being indicated by arrows, all of the exhaust ports being designated by O, it being understood that such exhaust ports are connected to an exhaust line system leading back to the sump of the pump or pumps although such exhaust line system is not illustrated;

Fig. 2 showing the condition for second, i.e. high speed,

Fig. 3 showing a transitional condition existing during the operation of shifting the transmission to first or low speed;

Fig. 4 showing the condition for first gear, i.e. low speed;

Fig. 5 is a view similar to that of Fig. 1 of a transmission including electro-magnetic clutches of the control circuit thereof;

Fig. 6 illustrating such control circuit when clutch K2 is energized;

Fig. 7 shows the control circuit in the transitional condition where both clutches are energized, and Fig. 8 represents the control circuit in the condition in which clutch K1 only is energized.

In Figs. 1 and 1a, a speed change transmission is shown which provides for two different ratios of transmission. It comprises an input shaft $a$, an output shaft $d$, and two trains of motion-transmitting elements having different ratios of transmission and connecting shafts $a$ and $d$. One such train comprises a shaft $e$ connected to the input shaft $a$, a clutch K2 composed of a clutch member $a'$ and a clutch member $d'$, and a shaft $f$ integral with the output shaft $d$. The other train of motion-transmitting elements comprises a gear $a1$ connected to the input shaft $a$, a gear $b1$ permanently meshing with gear $a1$, a lay shaft $b$ carrying gear $b1$ and mounted in stationary bearings, a clutch K1 composed of clutch members $b'$ and $c'$, a shaft $c$ mounted in stationary bearings, a spur pinion $c1$ fixed to shaft $c$, and a gear $d1$ fixed to the output shaft $d$.

Preferably, each of the two clutch members $a'$ and $d'$ includes a set of angular friction discs, both sets being interleaved. In Fig. 1 each disc 100 of one of the sets has external teeth engaging longitudinal slots in the peripheral wall of the drum-shaped clutch member $a'$, whereas each disc 101 of the other set has internal teeth engaging longitudinal grooves of the cylindrical clutch member $d'$ disposed inside of the clutch member $a'$. A piston 102 is slidably mounted within the cylindrical or drum-shaped clutch member $a'$ and is adapted to urge the stack of leaves into contact with an annular abutment 103 carried by and secured to the clutch member $a'$. The piston 102 has a tubular hub 104 slidably mounted on the tubular hub 105 of the clutch member $a'$ that is fixed to the shaft $a$. A helical spring 106 surrounds the tubular hub 104 and is braced against the piston 102 on the one side and against an annular member 107 on the other side which is fixed to the hub 105 of the clutch member $a'$. A suitable liquid under pressure may be admitted to the space between the piston 102 and the end wall of the clutch member $a'$ through a duct 108 provided in the shaft $a$ and permanently communicating with a duct 43.

The clutch K1 is similar to the clutch K2 and therefore need not be described in detail. Like clutch K2 it includes a spring tending to keep the clutch disengaged but it may be engaged by the admission of fluid under pressure through a conduit 59. This transmission is in the high speed or second gear condition when clutch K2 is engaged and clutch K1 is disengaged. It is in the low speed or first gear condition when clutch K2 is disengaged and clutch K1 is engaged causing the power to be transferred from the input shaft $a$ to the output shaft $d$ via gear $a1$, gear $b1$, lay shaft $b$, clutch K1, shaft $c$, pinion $c1$, and gear $d1$.

In the second gear condition input shaft $a$ and output shaft $d$ have the same rotary speed, the clutch K2 being engaged, while the shaft $b$ and clutch member $b'$ of clutch K1 rotate at a lower speed than do the clutch member $c'$ of clutch K1 and the shaft $c$. The novel method for shifting the transmission from high speed to low speed comprises the steps of partially engaging clutch K1 included in the train of the lower ratio of transmission permitting the clutch K2 included in the train of the higher ratio of transmission to slip until the clutch K1 is synchronized and thereupon fully engaging the clutch K1 and disengaging the clutch K2. For the purpose of partially engaging the clutch K1 the members $b'$ and $c'$ thereof are pressed upon each other with a pressure lower than that required for full engagement, thus permitting the clutch members to slip. The slipping clutch transfers a couple from the output shaft $d$ through gears $d1$ and $c1$, and shaft $c$ and further through shaft $b$, gears $b1$ and $a1$ to shaft $a$.

The clutch K2 is preferably of a type incapable of transferring a torque which exceeds the engine couple substantially. The transfer of an additional couple from shaft $d$ via the elements $d1$, $c1$, $c$, K1, $b$, $b1$ and $a1$ to shaft $a$ imposes on clutch K2 an additional couple which is added to the driving couple of the engine and causes the clutch K2 to slip gradually. Moreover, this additional couple is operative to accelerate the engine whereby the slippage in clutch K1 is progressively reduced.

In this operation the output couple transmitted by shaft $d$ is reduced by the amount transferred to the clutch K1 whereas the portion of the engine torque transferred through shaft $a$ drops by the excess of the couple transferred from clutch K1 to clutch K2 over the capacity of clutch K2. This condition prevails in the described manner until the clutch members $b'$ and $c'$ of clutch K1 will be synchronized as a result of the acceleration of the engine. When synchronism has been reached, the engine couple will be split up, part of it being transmitted through clutch K2, such part depending upon the couple-transferring capacity of this clutch, and the balance being transmitted through clutch K1. During this ratio shifting operation the output couple transferred through shaft $d$ has been maintained substantially on the level of the high speed output couple. Only on disengagement of clutch K2 will the output couple change to the magnitude of the low speed couple.

From the foregoing description it will appear that the ratio shifting operation from high speed to low speed will be automatically effected by subjecting clutch K1 to engaging pressure and by disengaging clutch K2 after a certain period of time, provided that the clutch K2 is of a type which will commence to slip when its load exceeds a certain limit. Many of the prior friction clutches of orthodox design do not comply with that requirement. Therefore, preferably clutches of other types are used, such as clutches including interleaved friction discs as shown in Fig. 1 or a suspension in oil of a pulverized magnetizable metal which, under the effect of an electromagnetic field, will freeze and thus bind the members of the clutch for common rotation as shown in Fig. 5.

The couple transferred to the transmission through shaft $a$ may be expressed by the following equation:

$$M_a = M_{k2} - i_k \cdot M_{k1}$$

$M_a$ being the portion of the engine couple transmitted through shaft $a$; $i_k$ being the ratio of transmission of the pair of gears $a1$, $b1$; $M_{k2}$ being the couple transferred by clutch K2 and $M_{k1}$ being the couple transferred by clutch K1.

When the total engine couple exceeds the couple $M_a$ transferred through shaft $a$, the excess of the engine couple serves to accelerate the engine.

As long as the clutch K1 is in disengaged condition, the entire input couple $M_a$ which equals the engine couple is transferred by the clutch K2 to the output shaft $d$. When K1 is gradually engaged, however, transferring an increasing couple $M_{k1}$, the torque applied to K2 increases accordingly until such torque reaches the limit $M_{k2}$ corresponding to the full capacity of the clutch K2 causing the same to slip. A further increase of the couple $M_{k1}$ results in a reduction of the couple $M_a$. The surplus of the engine couple over the couple $M_a$ is available to accelerate the engine. Hence, it will appear that the rapidity of the ratio shifting operation may be controlled by properly controlling the couple $M_{k1}$. The couple applied to the output shaft $d$ may be expressed by the following equation:

$$M_d = M_{k2} - M_{k1}/i_g$$

$i_g$ being the ratio of transmission of the pair of gears.

It follows from this equation that $M_{k1}$ must be so controlled as not to exceed a predetermined limit lest $M_d$ would become negative, considering that $M_{k2}$ has a predetermined value, thus braking the vehicle which is frequently undesirable. As soon as acceleration of the engine and of shaft $b$ geared thereto has synchronized the members $b'$ and $c'$ of clutch K1, the conditions expressed by the following equation prevail:

$$M_d = M_{k2} \frac{i_g \cdot i_k - 1}{i_g \cdot i_k} + \frac{M_a}{i_g \cdot i_k}$$

A preferred embodiment of the present invention involving fluid-operable actuating means for the clutches K1 and K2 is diagrammatically illustrated in Figs. 2-4 including sectional representations of a number of slide valves and diagrammatically indicating the ducts or conduits connecting such slide valves with pumps and with fluid-operable rams for the actuation of the clutches by simple lines, heavy lines being used to indicate conduits or ducts under pressure, and thin lines being used to indicate such ducts or conduits as are put on exhaust. A return manifold connecting the various outlets marked O with the sump or sumps has been omitted for sake of clarity.

A suitable liquid, such as oil under pressure, is supplied by a pump 10 geared to the engine by suitable means (not shown) and provided with a relief valve 11. The output conduit 12 of pump 10 communicates through conduits 13 and 14 with suitable ports of a shifting valve U. The valve U comprises a housing and an axially movable valve member comprising a plurality of control pistons 17, 18, 19 and 20 held in spaced relationship by a common valve stem 16 integral therewith. Between themselves and the end walls of the housing 15 the pistons confine control chambers 21, 22, 23, 24, and 25. The housing is provided with an outlet port 23a. A helical pressure spring 26 is included in chamber 25 acting on control piston 20 and thus tending to keep the valve member in the position shown in Fig. 2.

The control chamber 21 communicates through a conduit 27 with a port provided in the housing of a pressure control valve S3. The valve member 28 of valve S3 comprises a pair of pistons held in spaced relationship by a stem and movably mounted in a cylindrical bore in the valve housing to control various ports including the port communicating with conduit 27. A helical pressure spring 29 is inserted between the valve member 28 and an actuator connected to the accelerator linkage 29a. The end chamber 30 disposed in the housing of valve S3 opposite to the spring 29 communicates with a branch of conduit 27. In this manner, the valve member 28 will always position itself so as to balance the pressure exerted by spring 29 against the fluid pressure prevailing in chamber 30. The inner edge of the control piston of valve member 28 which confines the end chamber 30 controls a port connected by a conduit 31 to the pressure pipe 12, whereas the outer edge of the same control piston controls an outlet port 31a. Since the control chamber surrounding the stem of valve member 28 is in permanent communication with the control chamber 30, the piston will always move to a position in which the two edges above referred to will throttle the flow of oil from conduit 31 through pipe 27 to outlet port 31a in such a manner as to maintain such control chambers and the conduit 27 under a pressure depending on the position of the throttle of the engine. This pressure is communicated to control chamber 21 of valve U.

Chamber 22 of the shifting valve U is in permanent communication through a pipe 33 with a port provided in the chamber 39 of the housing of a change valve W which includes an axially movable valve member comprising a control piston 35 of smaller diameter confining chamber 39, a control piston 36 of larger diameter confining chamber 41, an intermediate stem 34 integral with the control pistons and extending through a chamber 40, and a stop member 37 surrounded by a helical pressure spring 38 acting on the end face 36b of control piston 36. The chamber 40 is provided with two ports, one port being permanently connected by a conduit 43 to the actuating element associated with the friction clutch K2. This actuating element is diagrammatically illustrated in Fig. 2 by a circle.

The other port of chamber 40 is controlled by piston 36 and is connected to pressure conduit 12. The control chamber 23 of shifting valve U is connected by a conduit 44 to conduits 46 and 47. The conduit 46 is connected to the chamber 41 of the change valve W whereas the conduit 47 communicates with an accumulator R composed of a cylindrical housing, a piston 49 movable therein, and a helical pressure spring 50. Preferably, the characteristic of spring 50 is so chosen that the force it exerts on piston 49 is substantially constant and can be overcome by a fluid pressure prevailing in conduit 47 which is but a fraction of the pressure required for full engagement of the clutch K1. The housing of the accumulator has a stop 50a limiting the travel of piston 49 effected under fluid pressure. A throttle 45 is included in the conduit 44.

An actuating element associated with the friction clutch K1 is controlled by a valve S1 which comprises a housing having a number of ports and a cylindrical bore accommodating a valve member comprised of a control piston 52, a control piston 53, and an intermediate stem 51. A helical pressure spring 54 is inserted in chamber 57 between control piston 53 and the associated end wall of the valve housing tending to keep the valve member in the position shown in Fig. 2. The space 56 between the control pistons 52 and 53 is in permanent communication with a conduit 59 leading to the actuating element of the clutch K1, such actuating element being diagrammatically illustrated in Fig. 2 by a circle surrounding the reference character K1. Moreover, space 56 may be put in communication with or cut off from a port communicating with the branch 58 of conduit 47. The chamber 57 has a port connected by a conduit 60 to the conduit 43. Moreover, the space 56 may register with or be cut off from a port connected by conduit 61 with the main pressure conduit 12. The end chamber 55 confined by the piston 52 of valve S1 is connected by a conduit 63 to a port provided in the housing of another valve S2. This valve includes an axially movable valve member 64 comprised of a pair of control pistons kept in spaced relationship by a stem, the latter being manually adjustable into one or the other of two positions by a hand lever which has been indicated diagrammatically, the "on"-position of the hand lever being shown in full lines and the "off"-position by a dash-dotted line. When the hand lever is in the "on"-position as shown, the space provided between the control pistons of valve member 64 registers with two ports, one port being connected to conduit 63 and the other port being connected by a conduit 62 to the main pressure line 12. When the hand-lever is shifted to the dash-dotted position, the valve member will cut off conduit 62 and will establish communication between conduit 63 and an exhaust port provided in the housing of valve S2. A second pump 32a is geared to the output shaft d of the transmission or to the gears of the vehicle so as to produce a pressure commensurate with the speed of the vehicle. This pump is connected by the conduit 32 with a port provided in chamber 25 of shifting valve U. The operation is as follows:

Let it be assumed that the transmission shown in Fig. 1 is installed in a vehicle that is driven in high gear, i.e. second gear, with the throttle of the engine closed partly. The pump 10 feeds oil under pressure into the main line 12 from which the branch conduits 13 and 14 supply the liquid under pressure to the shifting valve U. The control piston 16, is held by the spring 26 and the pressure maintained by pump 32a is chamber 25 in its lowermost position, the pressure in chamber 21 being comparatively low because linkage 29a is in the position in which the throttle is closed partly. Liquid under pressure will flow via conduit 13, chamber 22, and conduit 33 into chamber 39 of change valve W acting on the end face 35a of piston 35 of smaller diameter whereby the valve member of change valve W is moved to the right hand end position illustrated in Fig. 2 contrary to the force of spring 38. At the same time the liquid under pressure flows from the main line 12 through chamber 40 of change valve W and through conduit 43 to the actuating element of clutch K2 for higher speed thereby keeping clutch K2 engaged. The pressure prevailing in chamber 40 aids the pressure prevailing in chamber 39 in keeping the valve member in the right hand end position shown in Fig. 2 since the pressure in chamber 40 acts on the differential area of end face 36a of piston 36 with respect to end face 35a of piston 35. At the same time liquid under pressure is supplied from conduit 43 through conduit 60 to chamber 57 of valve S1, such pressure aiding spring 54 in keeping the valve member of valve S1 in the left hand position shown in Fig. 2 whereby the port connected to conduit 61 is sealed while chamber 56 is put on exhaust via conduits 58, 47 and 44, chamber 23 and outlet port 23a. From the main line 12 liquid under pressure is conducted via conduits 62 and 63 into the chamber 55 of valve S1. However, this pressure acting on end face 52a of piston 52 cannot overcome the pressure of spring 54 and the liquid pressure acting on end face 53a of piston 53. Hence, it will appear that the actuating element associated with clutch K2 is energized whereas the actuating element of clutch K1 is deenergized whereby clutch K2 is kept engaged and clutch K1 is kept disengaged.

The ratio shifting operation will be initiated automatically either by a reduction of the speed of travel of the vehicle below a certain limit owing to an up-grade of the road, for instance, resulting in a drop of fluid pressure in chamber 25, or by the driver unthrottling the engine whereby an increase of pressue of spring 29 is produced entailing an increase of the liquid pressure in chamber 21 acting on end face 17a of piston 17. The drop of pressure in chamber 25 or the increase of pressure in chamber 21 or both result in movement of the valve member of the shifting valve U to its upper position shown in Figs. 3 and 4.

As a result, chamber 39 of change valve W is put on exhaust via conduit 33, chamber 22, and outlet port 23a. The pressure exerted on end face 35a of the valve member of change valve W drops to zero. Liquid under pressure is supplied from main line 12 via the branch conduit 14, chamber 23, conduit 44 to conduits 46 and 47. From conduit 47 the liquid under pressure is supplied via branch conduit 58, chamber 56, and conduit 59 to the actuating element associated with the clutch K1 for the lower speed. Moreover, fluid under pressure is supplied from conduit 47 to the chamber 48 of accumulator R. Owing to the displacement of piston 49 of the accumulator contrary to the force of spring 50, the stream of liquid flowing through the conduit 44 is quite considerable and results in a substantial drop of pressure on passage of the liquid through the throttle 45. The pressure drops to the level determined by the area of accumulator piston 49 and spring 50.

The low pressure condition in conduits 46, 47 and 58 prevails for a certain period of time as long as the travel of piston 49 into contact with abutment 50a will last. The low pressure is transferred from conduit 46 to the chamber 41 of change valve W and will act on the end face 36b of the valve member. Meanwhile full liquid pressure is maintained in chamber 40 acting on the differential between the end faces 36a and 35b and on the actuating element of clutch K2. Therefore, the valve member of change valve W will be kept in its right hand position illustrated in Fig. 3, the reduced liquid pressure supplied through conduit 46, even though assisted by the spring 38 and the full pressure acting on end face 35b, being unable to overcome the high pressure acting on end face 36a.

Valve S1 is kept in its left hand position shown in Fig. 3 by the full presure supplied via conduit 12, chamber 40, and conduits 43 and 60 and acting on end face 53a. The throttling device 45 included in the conduit 44 is preferably so constructed that it will offer a larger resistance to flow from conduit 44 towards conduits 46 and 47 than it will do in the opposite direction. This may be effected by placing a small check valve in shunt to the throttle 45, such check valve opening towards conduit 44.

It is the purpose of the throttling device to enable the pump 10 to maintain full pressure in line 12 and in the actuating element of clutch K2, when conduit 44 is put on pressure during the ratio shifting operation, thereby preventing a drop of the clutching pressure in clutch K2. Moreover, the throttling device controls the period of time during which the clutch K1 is subjected to a reduced pressure and the accumulator R is filled up.

As soon as the piston 49 of the accumulator R arrives in contact with the abutment 50a and is stopped thereby, the quantity of liquid flowing per time unit through the throttling device 45 drops considerably whereby the pressure prevailing in conduits 46 and 47 will rise substantially to the full pressure prevailing in line 12. This high pressure will now act on the clutch K1. At the same time the pressure acting on end face 36b of the valve member of valve W assisted by the spring 38 and by the liquid pressure acting on end face 35b will overcome the pressure acting on the end face 36a shifting the valve member of valve W to the left into the position illustrated in Fig. 4 As a result, the port of valve W communicating with the main line 12 will be cut off by the control piston 36, and at the same time the conduit 43 will be put on exhaust by connection of chamber 40 with the outlet port 40a thus causing the actuating element of clutch K2 to effect disengagement of this clutch. Moreover, at the same time the end chamber 57 of valve S1 will be relieved from pressure via conduits 60 and 43 so that the pressure acting on the end face 52a will move the valve member of valve S1 to the right. As a result, the conduit 59 leading to the actuating element of clutch K1 will be cut off from the conduit 58 and will be directly connected with the conduit 61 thus maintaining full pressure in conduit 59 and the actuating element of clutch K1. Hence, it will appear that when this condition has been reached, the clutch K1 is fully engaged whereas the clutch K2 is fully disengaged.

When the speed of travel increases to a certain extent or when the driver cuts the throttle of the engine, the transmission will be shifted to the higher speed because the increased speed of travel increases the pressure produced by pump 32a whereas a closing of the throttle reduces the pressure prevailing in conduit 27. As a result, the valve member of the shifting valve U will be moved by spring 26 to its lower end position thus discharging the accumulator R, the conduits 46 and 47, and the valve chamber 41 from pressure via the throttle 45 and the check valve shunted thereacross and via the chamber 23 and the outlet 23a, see Fig. 2. The differential valve member 34 of valve W is moved to the right by the pressure supplied to the chamber 39 through main line 12, branch conduit 13, chamber 22, and conduit 33. The pressure thus supplied to chamber 39 acts on end face 35a overcoming the opposing force of spring 38. As a result, conduit 43 leading to the actuating element of clutch K2 is directly connected with the main line 12 through the chamber 40 whereby clutch K2 is engaged. At the same time the liquid under pressure acting through conduit 60 is supplied to the control chamber 57 acting on end face 53a of valve S1 shifting the valve member to the left into the position shown in Fig. 2, thus cutting off conduit 59 from the pressure line 61 and putting the same on discharge via conduits 58, 47, 44, chamber 23 and outlet 23a. Hence, it will appear that the clutch K1 will be disengaged when the pressure in line 43 has risen consequentially to engagement of clutch K2. Thus, the transfer of a driving couple from the input shaft a to the output shaft d will not be interrupted during the ratio changing operation, no matter whether the gear is shifted from the lower to the higher speed ratio or vice versa. The pressure prevailing in the control chamber 25 which depends on the speed of travel of the vehicle has the effect that for a given position of the engine throttle the automatic shifting operation from the higher speed to the lower speed will take place the later the higher the rate of travel will be. Vice versa, the ratio changing operation from the lower speed to the lower speed will be effected the earlier the higher the speed of travel will be, provided that a constant pressure be maintained in chamber 21.

When the operator moves the hand lever controlling valve S2 to the dash-dotted off-position, the valve member of valve S1 will be always kept in its left end position thus keeping clutch K1 connected to conduit 47.

If desired, the principle described hereinabove may be applied to a transmission having more than two ratios of transmission, the shifting operation between two consecutive ratios corresponding to the operation described hereinabove.

In Figs. 5–8 a transmission having clutches including a suspension of a pulverized magnetizable metal, such as mentioned hereinabove and a control circuit for such transmission are shown.

The clutch type 2 comprises a hollow drum-shaped clutch member a' fixed to the input shaft a and surrounding an annular member 200 having a peripheral groove laterally confined by an outwardly extending flange 201 which is fixed to the end face of the peripheral wall of the clutch member a'. This groove accommodates a magnetic coil 202 producing a flux extending through the gap between the peripheral surface 203 of the annular member 200 and the internal surface of the peripheral wall portion of the drum-shaped clutch member a'. The driven member d' which is fixed to the shaft f that is integral with the driven shaft d of the transmission is formed with a disk 204 having a substantially cylindrical flange 205 which engages the aforementioned gap. The internal space of the clutch member a' is filled with a suspension of a pulverized magnetizable metal such as iron in oil. However, dry pulverized iron or other suitable metal loosely filling the peripheral gap between the driving clutch member a' and the driven clutch member d' could be used. One end of the coil 202 is grounded by connection with the mass, whereas the other end is connected to a conductive annular strip 206 carried by a conical projection of the annular member 200 and suitably insulated therefrom. This strip 206 engages a stationary brush 207 fixed to a bracket 208.

The clutch K1 is similar to the clutch K2. A detailed description thereof is deemed dispensable.

The control circuit includes a pair of relays Rel 1 having an armature not shown mechanically connected with contact arms 111, 112, 113 and 114 and a relay Rel 2 having an armature mechanically connected with contact arms 121 and 122. The relay Rel 1 is a differential relay having a pair of windings, one winding being connected with one terminal of a battery B via a switch S1, a wire 130, a variable resistor R1, a wire 132, a resistor R2, and a wire 133, the other terminal of this winding of the relay Rel 1 being grounded. The other winding of the relay Rel 1 has one terminal likewise grounded, whereas the other terminal is connected to a speedometer generator G geared to the driven shaft D of the transmission to generate a voltage proportional to the speed of travel of the vehicle.

The slidable contact of the variable resistor R1 is mechanically connected with the lever 29a shown in Fig. 4 for adjustment by the accelerator pedal. When this pedal is in the idling position, the resistor R1 is adjusted to its maximum resistance. When the pedal is depressed, this resistance is gradually reduced. The resistance will be a minimum when the accelerator pedal is fully depressed. The winding of the relay Rel 1 energized by the battery B tends to attract the contact arms 111–114 which in Fig. 6 are shown in their resting position which they assume when the effect of the battery-energized winding of the relays is offset by the generator-energized winding. The switch S1 is a main switch which when opened causes disengagement or deenergization of both of the clutches K1 and K2 to permit the engine to idle. The contact arm 122 connects wire 130 with a conductor 143 leading to the brush 207. The relay Rel 2 has one terminal grounded whereas its other terminal is connected to the conductor 143 through the intermediary of a wire 134, the contact arm 114, a switch S2 and a bimetal-controlled switch S3. This switch is of a type which when put under current will open automatically after expiration of a certain period of time. The wire 134 is connected to the wire 130 by the contact arm 113. The brush of the clutch K1 is connected to a conductor 159 leading to one terminal of a resistor R3, the other terminal of which is connected to the wire 130 through the intermediary of the relay contact arm 112. In this connection the resistor R3 is bypassed by the relay contact arm 121.

In Fig. 5 all of the relay contact arms are shown in their normal position with the relay coils being deenergized. Hence, it will appear that normally, i.e. with the relay windings being deenergized, the contact arms 121 and 113 are closed and the contact arms 111, 112, 114 and 122 are open.

In Fig. 6 the circuit system is shown in the high speed position with the clutch K2 being energized for the transfer of motion, whereas the clutch K1 is deenergized. The relay Rel 2 is energized in the following circuit: ground, battery B, closed switch S1, wire 130, contact arm 113 (now closed because the differential relay Rel 1 is now deenergized), wire 134, winding of relay Rel 2 and ground. As a result, the contact arm 121 is opened, whereas the contact arm 122 is closed, the latter establishing a circuit extending from ground through the battery B, the switch S1, the wire 130, the contact arm 122 and the wire 143 to the clutch K2 energizing the same. Let it be assumed that the vehicle is being driven at a moderate speed with the accelerator pedal so far depressed as to produce a balance between the current produced by the speedometer generator G and the current set up by the variable resistor R1.

Let it now be assumed that the driver wishes to accelerate the vehicle and, for this purpose fully depresses the accelerator pedal. For the purpose of high acceleration it is desirable that the ratio of transmission be shifted to its lower value. This is effected as follows: Owing to the depression of the accelerator pedal the resistance of the variable resistor R1 is considerably reduced increasing the energization of the left-hand winding of relay Rel 1. As a result, the effect of this winding will overcome the effect of the other winding connected to the speedometer generator G and the contact arms 111, 112, 113 and 114 will be attracted. This establishes a connection from the battery B to the clutch K1 via the contact arm 112 and the resistor R3. As a result, the energization of clutch K1 is limited by the resistor R3 to a low value sufficient to transfer a limited torque from the gear c1 to the shaft b whereby the engine will be accelerated in the manner described hereinabove. While this condition lasts, the energization of relay Rel 2 is no longer effected via the contact arm 113, the latter having been opened by the relay Rel 1 but instead is effected via the relay contact arm 114, the switch S2, the switch S3, the contact arm 122 and the wire 130. After the condition of acceleration of the engine has lasted a certain period of time, the bimetal switch S3 will open and will deenergize relay Rel 2 closing contact arm 121 and opening contact arm 122. As a result, the clutch K2 will be deenergized and at the same time resistor R3 will be shortcircuited, thus applying the full energizing current to the clutch K1 enabling it to transfer the full driving torque.

Fig. 8 illustrates the control circuit in the condition thus achieved, while Fig. 7 shows the condition of acceleration of the engine with both of the clutches being energized.

The terminals of the resistor R2 are connected with the contact arm 111 and with the contact cooperating therewith respectively. Therefore, the energization of the relay Rel 1 will cause the resistor R2 to be shortcircuited. Hence, the energization of the left-hand winding of the relay Rel 1 is higher in the low ratio condition shown in Fig. 8 than in the high ratio condition shown in Fig. 6. This will have the desired hysteresis effect whereby the automatic ratio change from the low ratio condition back to the high ratio condition will be effected at a higher speed of the vehicle than the ratio change hereinabove described from the high speed condition to the low speed condition.

It will be understood, of course, that the partial energization of the clutch K1 via the resistor R3 results in such a condition of the pulverized metal in the gap of the clutch as to permit relative slippage of the two clutch members b' and c' of the clutch K1 and simultaneous transfer of a limited torque.

The electrical control circuit shown in Figs. 5–8 is fully equivalent to the hydraulic circuit shown in Figs. 2, 3 and 4, as will appear from the following table of the corresponding control elements.

| Electrical circuit | Hydraulic circuit |
|---|---|
| Battery B. | Oil pump 10. |
| Generator G. | Oil pump 32a. |
| Variable resistor R1. | Valve S3. |
| Relay Rel 1 having contact arms 111–114. | Shifting valve U. |
| Relay Rel 2 having contact arms 121 and 122. | Change valve W. |
| Bimetal switch S3. | Accumulator R. |
| Switch S2. | Valve S2. |

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. Method of controlling a speed change transmission of the type including an input shaft, an output shaft, at least two trains of motion-transmitting elements having different ratios of transmission and connecting said shafts and disengageable friction clutches in said trains, said method comprising engaging the second clutch included in the train of the higher ratio of transmission for high speed, at the same time without any overlap disengaging the first clutch included in the train of the lower ratio of transmission and, for shifting the transmission to low speed, the steps of engaging said first clutch under a certain pressure and of effecting disengagement of said second clutch but delaying said disengagement for a substantial interval while reducing said certain pressure to a degree permitting slippage of said first clutch during said interval in which said second clutch is still engaged.

2. Transmission drive ratio changing mechanism for a transmission of the type including an input shaft, an output shaft, at least two trains of motion-transmitting elements having different ratios of transmission and connecting said shafts and disengageable friction clutches in said trains, said mechanism comprising a first actuating element associated with the first friction clutch included in the train of the lower ratio of transmission for subjecting said first clutch to and for relieving it from engaging pressure, a second actuating element associated with the second friction clutch included in the train of the higher ratio of transmission for subjecting said second friction clutch to and for relieving it from engaging pressure, ratio changing means shiftable from a high gear position to a low gear position and vice versa and co-operatively connected with said actuating elements and adapted, when shifted to said high gear position, to cause said second actuating element to subject said second clutch to full engaging pressure and at the same time without any overlap causing said first actuating element to relieve said first clutch from engaging pressure and, when shifted to said low gear position, to reverse the function of said actuating elements thereby causing relief of said second clutch from pressure and subjecting said first clutch to pressure, a time lag control device associated with said ratio changing means to be rendered effective in said low gear position thereof to delay said relief of said second clutch from pressure for an interval, and pressure reducing means controlled by said time lag device for reducing the pressure acting on said first clutch during said interval, said ratio-changing means being so associated with said time lag control device that, when said ratio-changing means is shifted to said high gear position, it prevents said time lag control device from delaying said relief of said first clutch from engaging pressure coincidental to the subjection to full engaging pressure of said second clutch.

3. Transmission drive ratio changing mechanism as claimed in claim 2 in which at least said second clutch is a clutch of the magnetic powder type capable of slipping under load without appreciable wear.

4. Transmission drive ratio changing mechanism as claimed in claim 2 in which said actuating elements are hydraulic rams and in which said ratio changing means is formed by valve means, said ratio changing mechanism further comprising a pump adapted to be selectively connected by said valve means to said rams, said time lag device being constituted by a pressure accumulator communicating with the ram constituting said first actuating element, said pressure reducing means being a throttle connecting said pump with said accumulator and being operative until completely filled to limit the fluid pressure when acting on said last-mentioned ram to a degree insufficient to cause full engagement of said first clutch.

5. Transmission drive ratio changing mechanism as claimed in claim 4 in which said valve means includes a valve adapted to control the ram associated with said second clutch and to be actuated by opposing pressures, one of said hydraulic pressures being the hydraulic pressure supplied to one of said rams and the other pressure being the hydraulic pressure supplied to the other one of said rams, whereby the ram of said second clutch will be disconnected from said pump and thus relieved from pressure when said accumulator becomes completely filled thereby increasing the pressure acting on the ram of said first clutch.

6. Transmission drive ratio changing mechanism as claimed in claim 4 in which said valve means includes a differential piston valve having opposed end faces of different size and a differential face, said piston valve being adapted to control the ram associated with said second clutch and to be actuated by opposing pressures, one of said pressures being the hydraulic pressure applied to the ram of said second clutch and acting on said differential face, the other one of said opposing pressures being the hydraulic pressure applied to the ram of said first clutch and acting on the larger one of said end faces.

7. Transmission drive ratio changing mechanism as claimed in claim 6 in which said ratio changing means further comprises a shifting valve adapted to control said differential piston valve by establishing or interrupting the connection between said pump and a cylinder space confined by the smaller one of said end faces, said shifting valve being also adapted to control the communication between said pump and said accumulator, said communication including a throttle.

References Cited in the file of this patent

UNITED STATES PATENTS

| Re. 21,410 | Small et al. | Mar. 26, 1940 |
| 2,519,449 | Findley | Aug. 22, 1950 |
| 2,567,042 | Wemp | Sept. 4, 1951 |
| 2,648,992 | Vincent | Aug. 18, 1953 |